M. G. CRANE.
Ice-Cream Freezer.
No. 59,366. Patented Nov. 6, 1866.
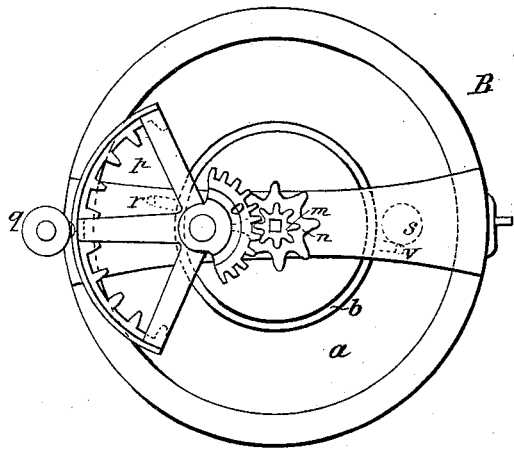
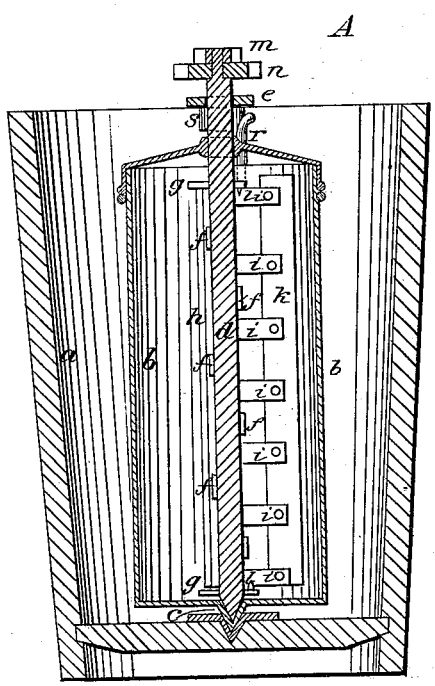
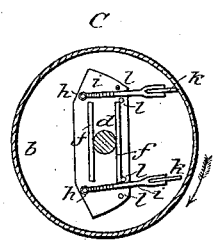
Witnesses:
S. B. Kidder
M. W. Frothingham
Inventor:
M G Crane
by Crosby & Gould
Attys

UNITED STATES PATENT OFFICE.

MOSES G. CRANE, OF CHELSEA, MASSACHUSETTS.

IMPROVED ICE-CREAM FREEZER.

Specification forming part of Letters Patent No. 59,366, dated November 6, 1866.

*To all whom it may concern:*

Be it known that I, MOSES G. CRANE, of Chelsea, in the county of Suffolk and State of Massachusetts, have invented an Improved Ice-Cream Freezer; and I do hereby declare that the following, taken in connection with the drawings which accompany and form part of this specification, is a description of my invention sufficient to enable those skilled in the art to practise it.

The invention relates to the construction or arrangement of parts of ice-cream freezers, and particularly to the mode of impelling or rotating the cream-cylinder in opposite directions in the ice or brine bucket, and to the manner of applying and operating scrapers within said cream-vessel.

The invention consists in the employment, in combination with the rotary spindle which carries the cream beaters and the scrapers, of a reciprocating rotary vessel, having arms or studs arranged diametrically at its top and a stationary stop or projection against which each of these projections strikes as the spindle is rotated, causing the cream-vessel to stop at each semi-rotation in either direction. Also in the arrangement or method of operation of the scrapers.

The drawings represent a freezer embodying my invention, A showing the same in central section. B is a plan of the same, and C a horizontal section of the cream-cylinder.

*a* denotes the ice-bucket; *b*, the cream-cylinder, supported centrally within the bucket by the pivot-bearing *c* and the bearing of the spindle *d* in a cross-bar, *e*, at the top of the bucket.

The vessel *b* turns freely on the spindle *d*, which has fixed upon it along its length a series of beaters, *f*. At its top and bottom, within the cylinder, the spindle bears horizontal plates, *g*, in which are journaled two long vertical rods, *h*, one on each side of the spindle *d*. From each of these rods, or from a plate attached thereto, arms *i* extend out, as seen at A and C, the outer ends of these arms carrying a vertical scraper, *k*. Each rod *h* turns loosely in its bearings, and so as to allow the scraper to swing in either direction to an extent limited by stop-pins *l*.

When the spindle is rotating in one direction the resistance of the cream to the movement of one scraper causes its edge to be thrown in a direction from the spindle into contact with the side of the cylinder and to scrape the adhering frozen cream therefrom, while the resistance to the movement of the other scraper causes it to be thrown toward the spindle, such movement, with respect to the spindle, being arrested by the inner stop-pins *l*.

Rotation of the spindle in the opposite direction reverses the position of the scrapers, each being alternately in contact with the cylinder, or thrown out of such contact in accordance with the direction of rotation of the spindle, thus insuring the scraping-action of one or the other of the scrapers at all times, and causing alternate currents of the cream from and toward the center of the vessel, one scraper laying the cream against the side of the vessel, where, as it freezes, the other scraper follows and removes it, throwing the frozen particles toward the center, commingling them with and hastening the congelation of the unfrozen cream.

The spindle *d* has fixed on its top two pinions, *m n*, one on top of the other, into which pinions two segment-gears, *o p*, mesh as they are rotated by a handle, *q*, one gear meshing into the upper pinion and driving the spindle rapidly in one direction until the other gear strikes into the other pinion and rotates the spindle in the opposite direction. This imparts the rotative movements to the scrapers and beaters and to the cylinder *b*, the rotation of which is caused not directly by the rotation of the spindle, but by the movement imparted to the cream and thence communicated to the cylinder.

Projecting from the top of the cylinder are two arms, *r*, which in the rotation of the cylinder strike alternately against a stop, *s*, on the bottom of the cross-plate *e*.

As the spindle is rotated in one direction, the movement thereby imparted to the beaters and scrapers is communicated by them to the cream, and by it to the cylinder, until, as the cylinder revolves, one of the arms *r* comes in contact with the stop *s*. Then the cylinder stops, and the spindle, beaters, and scrapers rotate therein, causing the action of the scrapers, as before set forth, until the spindle begins to rotate in the opposite direction, and with it the beaters, scrapers, and cylinder. This opposite rotation is imparted until the other arm $r$ brings up against the stop $s$, causing the opposite action of the scrapers, as above set forth, the alternate movements of the cylinder in the bucket agitating the ice or brine, and keeping it compacted against the sides of the cylinder, and the arrest of this movement causing the action of the scrapers with reference to the cream and to the sides of the vessel.

Where a large cylinder is employed, the reversing-gears may be dispensed with, the spindle being directly rotated (by a crank applied to it) several times in one direction, and this direction being then changed to the opposite one, causing the movements as above set forth.

I claim—

1. Combining with the cylinder $b$ and the spindle $d$ rotating therein, the scraper or scrapers $k$, acting alternately as the spindle is revolved in opposite directions, to throw the fluid cream against the sides of the vessel, and to scrape the frozen cream therefrom, substantially as set forth.

2. In combination with the spindle and the cream-cylinder rotating therein, the arms $r$ and projection $s$, operating to arrest the rotation of the cylinder, substantially as set forth.

MOSES G. CRANE.

Witnesses:
FRANCIS GOULD,
L. H. LATIMER.